United States Patent
Ma et al.

(10) Patent No.: US 10,127,092 B1
(45) Date of Patent: *Nov. 13, 2018

(54) METHOD AND APPARATUS FOR MONITORING A MESSAGE TRANSMISSION FREQUENCY IN A ROBOT OPERATING SYSTEM

(71) Applicant: BEIJING BAIDU NETCOM SCIENCE AND TECHNOLOGY CO., LTD., Beijing (CN)

(72) Inventors: Yu Ma, Beijing (CN); Weide Zhang, Beijing (CN); Wei He, Beijing (CN); Haifeng Wang, Beijing (CN); Yibing Liang, Beijing (CN); Zhuo Chen, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/039,144

(22) Filed: Jul. 18, 2018

Related U.S. Application Data

(63) Continuation of application No. 15/410,446, filed on Jan. 19, 2017, now Pat. No. 10,055,265.

(30) Foreign Application Priority Data

Sep. 6, 2016 (CN) .......................... 2016 1 0806462

(51) Int. Cl.
*G06F 9/54* (2006.01)
*G06F 11/30* (2006.01)

(52) U.S. Cl.
CPC .......... *G06F 9/546* (2013.01); *G06F 11/3024* (2013.01); *G06F 11/3055* (2013.01); *G06F 2209/508* (2013.01); *Y10S 901/50* (2013.01)

(58) Field of Classification Search
None
See application file for complete search history.

(56) References Cited

U.S. PATENT DOCUMENTS 6,006,270 A * 12/1999 Kobunaya .......... H04Q 11/0478
370/231
6,430,272 B1 * 8/2002 Maruyama ........ H04M 3/53333
379/67.1

(Continued)

FOREIGN PATENT DOCUMENTS

CN 103839006 A 6/2014

*Primary Examiner* — Craig C Dorais
(74) *Attorney, Agent, or Firm* — Seed IP Law Group LLP

(57) ABSTRACT

This disclosure discloses a method and apparatus for monitoring a message transmission frequency in a robot operating system. A specific implementation of the method includes: writing to-be-transmitted messages, into a pre-allocated memory; obtaining time points when the to-be-transmitted messages are written into the memory, and recording the time points in a preset time point list; determining a message transmission frequency within a preset time interval based on the time points in the time point list; and comparing the message transmission frequency with a preset message transmission frequency threshold, and generating monitoring information based on a comparing result. This implementation monitors the message transmission frequency of a process to thereby avoid information codes related to monitoring of each application from being added to the application so as to reduce the program debugging cost, and improve the monitoring efficiency.

13 Claims, 6 Drawing Sheets

(56) References Cited

U.S. PATENT DOCUMENTS 7,299,470 B2    11/2007  Curtis
7,478,130 B2     1/2009  Aoki et al.
9,628,386 B2 *  4/2017  Bortoloso ............... G06F 9/546

\* cited by examiner

METHOD AND APPARATUS FOR MONITORING A MESSAGE TRANSMISSION FREQUENCY IN A ROBOT OPERATING SYSTEM

CROSS REFERENCE TO RELATED APPLICATIONS

This application claims the priority of Chinese Patent Application No. 201610806462.1, entitled "Method and Apparatus for Monitoring a Message Transmission Frequency in a Robot Operating System," filed on Sep. 6, 2016, the content of which is incorporated herein by reference in its entirety.

TECHNICAL FIELD

The present application generally relates to the field of computer technology, particularly to the field of Internet technology, and more particularly to a method and apparatus for monitoring a message transmission frequency in a robot operating system.

BACKGROUND

A Robot Operating System (ROS) is a standard open source code operating system, it provides a series of software frameworks and utilities to assist a software developer in creating application software, and to provide hardware abstraction, control on underlying devices, implementation of common functions, inter-process message communication, management on data packets, and other functions. The ROS is a distributed processing framework in which the developer can individually design an executable file. Different processes can receive and publish various information (e.g., sensing, control, states, plans). There are applications running in the robot operating system, each of which can be regarded as a node. The robot operating system provides its own solution to monitor message transmission frequencies of the respective nodes.

However in the solution provided by the existing robot operating systems to monitor the message transmission frequency, the respective nodes on which the operating system operates are monitored separately, at the same time information related to monitoring of the respective nodes is added to each node, thus increasing the development and testing cost, and incurring technical problems in operation. This monitoring method may also have difficulties to monitor a message transmission frequency of a third-party node.

SUMMARY

An objective of the present application is to provide an improved method and apparatus for monitoring a message transmission frequency in a robot operating system so as to address the technical problem mentioned in the foregoing Background section.

In a first aspect, an embodiment of the present application provides an improved method for monitoring a message transmission frequency in a robot operating system, the method including: writing to-be-transmitted messages into a pre-allocated memory; obtaining time points when the to-be-transmitted messages are written into the memory, and recording the time points in a preset time point list; determining a message transmission frequency within a preset time interval based on the time points in the time point list; comparing the message transmission frequency with a preset message transmission frequency threshold; and generating monitoring information based on a comparing result.

In some embodiments, the method further includes: loading a preset configuration file, wherein the configuration file is retrieved when a process is started, and the configuration file comprises identification information of the processes, the message transmission frequency threshold, and transmission protocol information of the robot operating system.

In some embodiments, the obtaining the time points when the to-be-transmitted messages are written into the memory, and recording the time points in the preset time point list comprises: invoking a preset notification function to record the time points when the to-be-transmitted messages are written into the memory.

In some embodiments, the obtaining the time points when the to-be-transmitted messages are written into the memory, and recording the time points in the preset time point list comprises: if the time point list is full, removing an earliest time point in the time point list according to an order of the time points when the to-be-transmitted messages are written into the memory recorded in the time point list, and adding the obtained time point to the time point list.

In some embodiments, the determining the message transmission frequency within the preset time interval based on the time points in the time point list comprises: counting a number of the time points in the time point list within the preset time interval, and determining the number of the time points as a message transmission number; and determining the message transmission frequency based on the message transmission number and the time points in the time point list.

In some embodiments, the determining the message transmission frequency based on the message transmission number and the time points in the time point list comprises: retrieving an earliest time point within the preset time interval from the time point list as a first message transmission time point; retrieving a latest time point within the preset time interval from the time point list as a last message transmission time point; and calculating the message transmission frequency in an equation of:

$$f = \frac{n-1}{T_n - T_1},$$

where T1 represents the first message transmission time point, $T_n$ represents the last message transmission time point, n represents the message transmission number, wherein n is a positive integer greater than or equal to 2, and f represents the message transmission frequency In some embodiments, the monitoring information comprises a monitoring level, and the comparing the message transmission frequency with the preset message transmission frequency threshold, and generating the monitoring information based on the comparing result comprises: generating the monitoring information at a first monitoring level, if the message transmission frequency is above a first preset message transmission frequency threshold and below a second preset message transmission frequency threshold; generating the monitoring information at a second monitoring level, if the message transmission frequency is above the second preset message transmission frequency threshold and below a third preset message transmission frequency threshold; and generating the monitoring information at a third monitoring level, if the message transmission frequency is below the first preset message transmission frequency threshold or above the third preset message transmission frequency threshold; and determining a message transmission state based on the monitoring information.

In some embodiments, the method further further comprising: sending the monitoring information to a server supporting the robot operating system.

In a second aspect, an embodiment of the present application provides an apparatus for monitoring a message transmission frequency in a robot operating system, the apparatus including: a writing unit configured to write to-be-transmitted messages into a pre-allocated memory; an obtaining unit configured to obtain time points when the to-be-transmitted messages are written into the memory, and to record the time points in a preset time point list; a determining unit configured to determine a message transmission frequency within a preset time interval based on the time points in the time point list; and a generating unit configured to compare the message transmission frequency with a preset message transmission frequency threshold, and to generate monitoring information based on a comparing result.

In some embodiments, the apparatus further comprises: a loading unit configured to load a preset configuration file, wherein the configuration file is retrieved when processes are started, and the configuration file includes identification information of the processes, the message transmission frequency thresholds, and transmission protocol information of the robot operating system.

In some embodiments, the obtaining unit includes: an invoking sub-unit configured to invoke a preset notification function to record the time points when the to-be-transmitted messages are written into the memory.

In some embodiments, the obtaining unit is further configured to: remove an earliest time point in the time point list according to an order of the time points when the to-be-transmitted messages are written into the memory recorded in the time point list, and add the obtained time point to the time point list, if the time point list is full.

In some embodiments, the determining unit includes: a counting sub-unit configured to count a number of the time points in the time point list within the preset time interval, and to determine the number of time points as a message transmission number; and a determining sub-unit configured to determine the message transmission frequency based on the message transmission number and the time points in the time point list.

In some embodiments, the determining sub-unit is further configured to: retrieve an earliest time point within the preset time interval from the time point list of as a first message transmission time point; retrieve a latest time point within the preset time interval from the time point list as a last message transmission time point; and calculate the message transmission frequency in an equation of:

$$f = \frac{n-1}{T_n - T_1},$$

where T1 represents the first message transmission time point, $T_n$ represents the last message transmission time point, n represents the message transmission number, wherein n is a positive integer greater than or equal to 2, and f represents the message transmission frequency In some embodiments, the monitoring information includes a monitoring level; and the generating unit is further configured to: generate the monitoring information at a first monitoring level, if the message transmission frequency is above a first preset message transmission frequency threshold and below a second preset message transmission frequency threshold; generate the monitoring information at a second monitoring level, if the message transmission frequency is above the second preset message transmission frequency threshold and below a third preset message transmission frequency threshold; and generate the monitoring information at a third monitoring level, if the message transmission frequency is below the first preset message transmission frequency threshold or above the third preset message transmission frequency threshold; and determine a message transmission state based on the monitoring information.

In some embodiments, the apparatus is further configured: to send the monitoring information to a server supporting the robot operating system.

With the method and apparatus for monitoring a message transmission frequency in a robot operating system according to the embodiments of the present application, the to-be-transmitted messages are written into the pre-allocated memory, the time points when the to-be-transmitted messages are written into the memory are recorded in the preset time point list; thereafter the message transmission frequency within the predetermined time interval is determined based on the time points recorded in the time point list; and finally the message transmission frequency is compared with a preset message transmission frequency threshold, and the monitoring information is generated based on the comparing result, to thereby reduce the program debugging cost, and improve the monitoring efficiency.

BRIEF DESCRIPTION OF THE DRAWINGS

Other features, objectives, and advantages of the present application will become more apparent upon reading the detailed description to non-limiting embodiments made with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
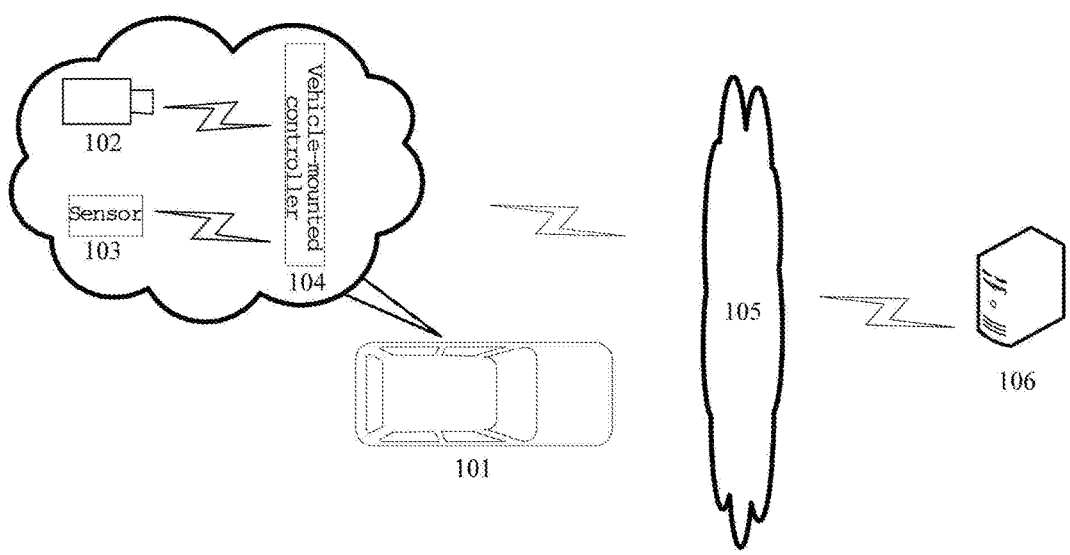
FIG. 1 is an architectural diagram of an exemplary system in which the present application may be implemented.

FIG. 1 illustrates an exemplary system architecture 100 in which a method or apparatus for monitoring a message transmission frequency in a robot operating system according to an embodiment of the present application may be implemented.

As illustrated in FIG. 1, the system architecture 100 may include a driverless vehicle 101, a cloud server 106, and a network 105. The network serves as a medium providing a communication link between the driverless vehicle 101 and the cloud server 106. The network 105 may include various types of connections, e.g., wired or wireless communication links, or optic fiber cables.

The cloud server 106 may be a server providing various services, e.g., a server configured to provide the driverless vehicle 101 with a message transmission abnormality indication.

The driverless vehicle 101 may be provided with acquiring devices 102 and 103, and a vehicle-mounted controller 104. The acquiring devices 102 and 103 may transmit acquired information to the vehicle-mounted controller 104 in various communication ways (e.g., over a wired or wireless communication link, or an optic fiber cable). The acquiring devices 102 and 103 may be various electronic devices acquiring surrounding environment information, including but not limited to a camera, a radar, etc. Through the cooperation of the modules in the vehicle, the vehicle-mounted controller 104 uses an improved robot operating system to convert the surrounding environment information acquired by the acquiring devices 102 and 103, and the message transmission abnormality indication information provided by the backend server 106 into control information, so that the vehicle travels stably and precisely on a road.

It should be noted that that the method for monitoring the message transmission frequency in the robot operating system according to an embodiment of the present application is generally performed by the vehicle-mounted controller 104, and accordingly an apparatus for monitoring a message transmission frequency in a robot operating system according to an embodiment of the present application is generally provided in the vehicle-mounted controller 104.

It should be appreciated that the numbers of acquiring devices, driverless vehicles, and backend servers in FIG. 1 are merely illustrative. Any number of acquiring devices, driverless vehicles, and backend servers may be provided based on the actual requirements. The vehicle-mounted controller may also operate separately without any backend server or network.

Figure 2:
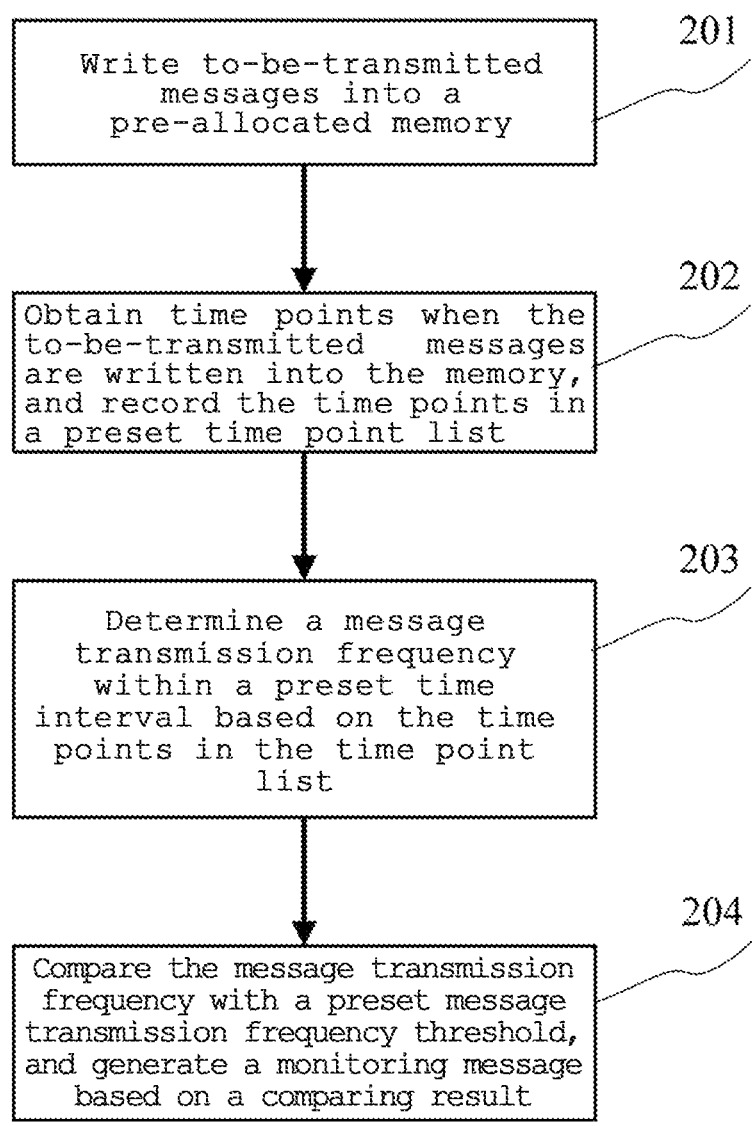
FIG. 2 is a flow chart of a method for monitoring a message transmission frequency in a robot operating system according to an embodiment of the present application.

Further reference will be made to FIG. 2 illustrating a flow 200 of a method for monitoring a message transmission frequency in a robot operating system according to an embodiment of the present application. The method for monitoring the message transmission frequency in the robot operating system includes the following steps:

Step 201, write to-be-transmitted messages into a pre-allocated memory.

The memory configured to store the to-be-transmitted messages is pre-allocated in an operating system on which the method for monitoring the message transmission frequency in the robot operating system operates in FIG. 1 (e.g., the robot operating system in the vehicle-mounted controller illustrated in FIG. 1), where the to-be-transmitted messages may be received messages, or messages to be sent. The memory may be a shared memory, where the shared memory refers to a memory accessible to different processes in a multi-process computer. In this embodiment, when processes are communicating with each other, the process that sends messages may store the to-be-transmitted messages into the shared memory pre-allocated by the robot operating system, and the process that receives messages may retrieve the messages from the shared memory in accordance with a transmission protocol between the two processes, thus realizing the communication between the processes.

Step 202, obtain time points when the to-be-transmitted messages are written into the memory, and record the time points in a preset time point list.

In this embodiment, there is further the time point list preset in the robot operating system, and there area number of processes running in the robot operating system, each application corresponds to at least one process, and each process may be regarded as a process node; and if there is a to-be-transmitted message between the processes, the time point when one of the processes writes the to-be-transmitted message into the memory will be obtained, and the obtained time point will be recorded in the time point list. Since there are a number of processes in the robot operating system, such a time point list is preset for each process that records message transmission time points of the process.

In this embodiment, the data recording approach of the above-mentioned time point list may be a circular recording approach, that is, the time points may be recorded sequentially in the time point list in the order of time, and after all the resources in the time point list are occupied, if there is a time point to be recorded, the data with the earliest recording time point will be shifted cyclically out of the time point list, and the latest time point will be populated at the location vacant after the data are shifted.

Step 203, determine a message transmission frequency within a preset time interval based on the time points in the time point list.

In this embodiment, the robot operating system may retrieve the time points within the predetermined time interval from the time point list based on the time points when the messages are written into the memory recorded in the time point list in step 202, and determine the message transmission frequency within the time interval based on the time points in the period of time. For example, the robot operating system may count the number of messages written into the memory within a time interval. If the interval of time is 2 seconds, the number of messages within the 2 seconds will be counted to thereby determine the message transmission frequency within the 2 seconds.

Step 204, compare the message transmission frequency with a preset message transmission frequency threshold, and generate monitoring information based on a comparing result.

In this embodiment, there are a number of message transmission frequency thresholds preset in the robot operating system operating on the vehicle-mounted controller as illustrated in FIG. 1. The message transmission frequency obtained in step 203 is compared with the preset message transmission frequency thresholds, and the monitoring information related to the comparing result is generated based on the result. The monitoring information may be a comparison report which has not been processed, or a message transmission frequency alarm report obtained as a result of an analysis by a preset diagnosis system.

Figure 3:
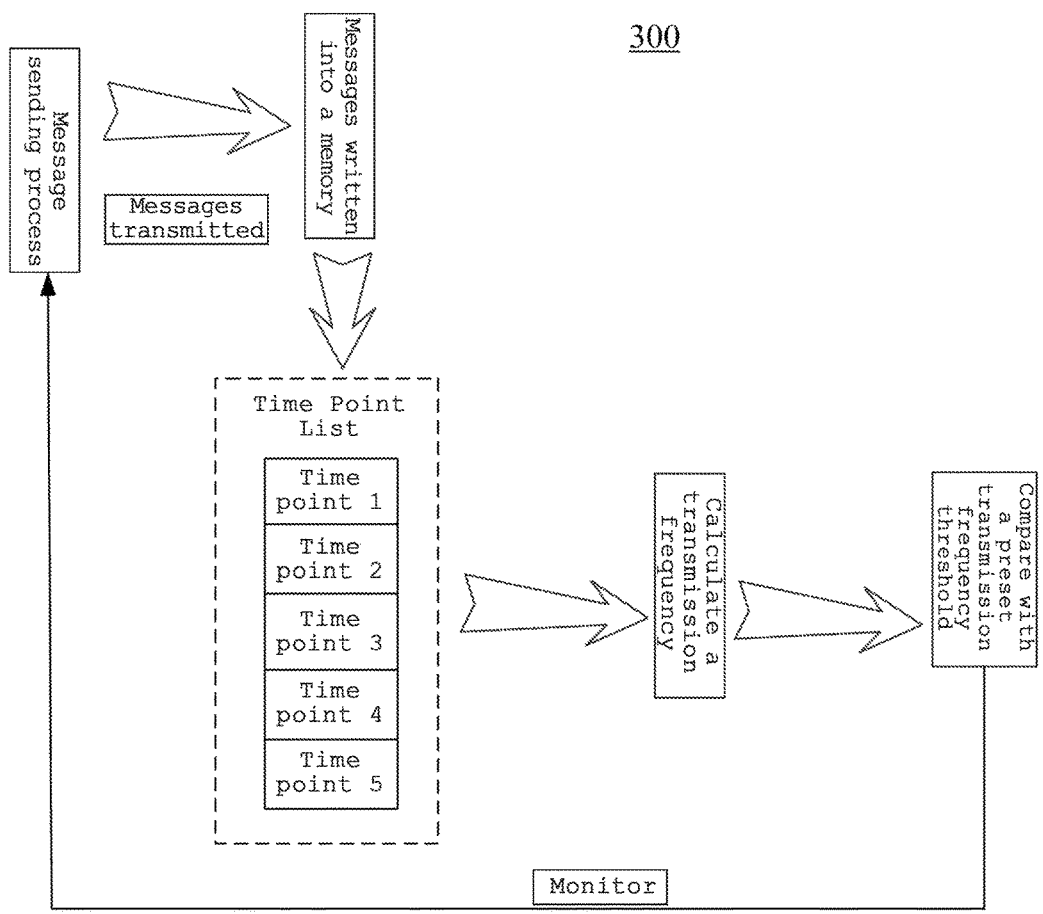
FIG. 3 is a schematic diagram of an application scenario of a method for monitoring a message transmission frequency in a robot operating system according to the present application.

Further reference will be made to FIG. 3 which is a schematic diagram 300 of an application scenario of the method for monitoring a message transmission frequency in a robot operating system according to this embodiment. In the application scenario illustrated in FIG. 3, the vehicle-mounted controller firstly initiates an instruction to the robot operating system to monitor a message transmission frequency of a message sending process of a vehicle speed sensor, and after a message sending process writes messages into the memory pre-allocated in the robot operating system, time points when the messages are written into the memory are recorded at this time into the time point list preset in the robot operating system. For example, 6 time points when the messages are written into the memory, i.e., "Time point 1" to "Time point 6", are recorded in the time point list in FIG. 3, and the number of time points in the time point list at this time is counted. Assuming the time from "Time point 1" to "Time point 6" is 0.5 second, the message transmission frequency of the message sending process will be "12 times per second", and the robot operating system will compare the actually obtained message transmission frequency with the preset message transmission frequency thresholds, generate monitoring information based on the comparing result, and monitor the message sending process.

With the method and apparatus for monitoring the message transmission frequency in the robot operating system according to the embodiments of the present application, the time points when the messages are transmitted are recorded, the actual message transmission frequency is determined and compared with the preset message transmission frequency thresholds, and the monitoring information is generated, thereby reducing the program debugging cost and improving the monitoring efficiency.

Figure 4:
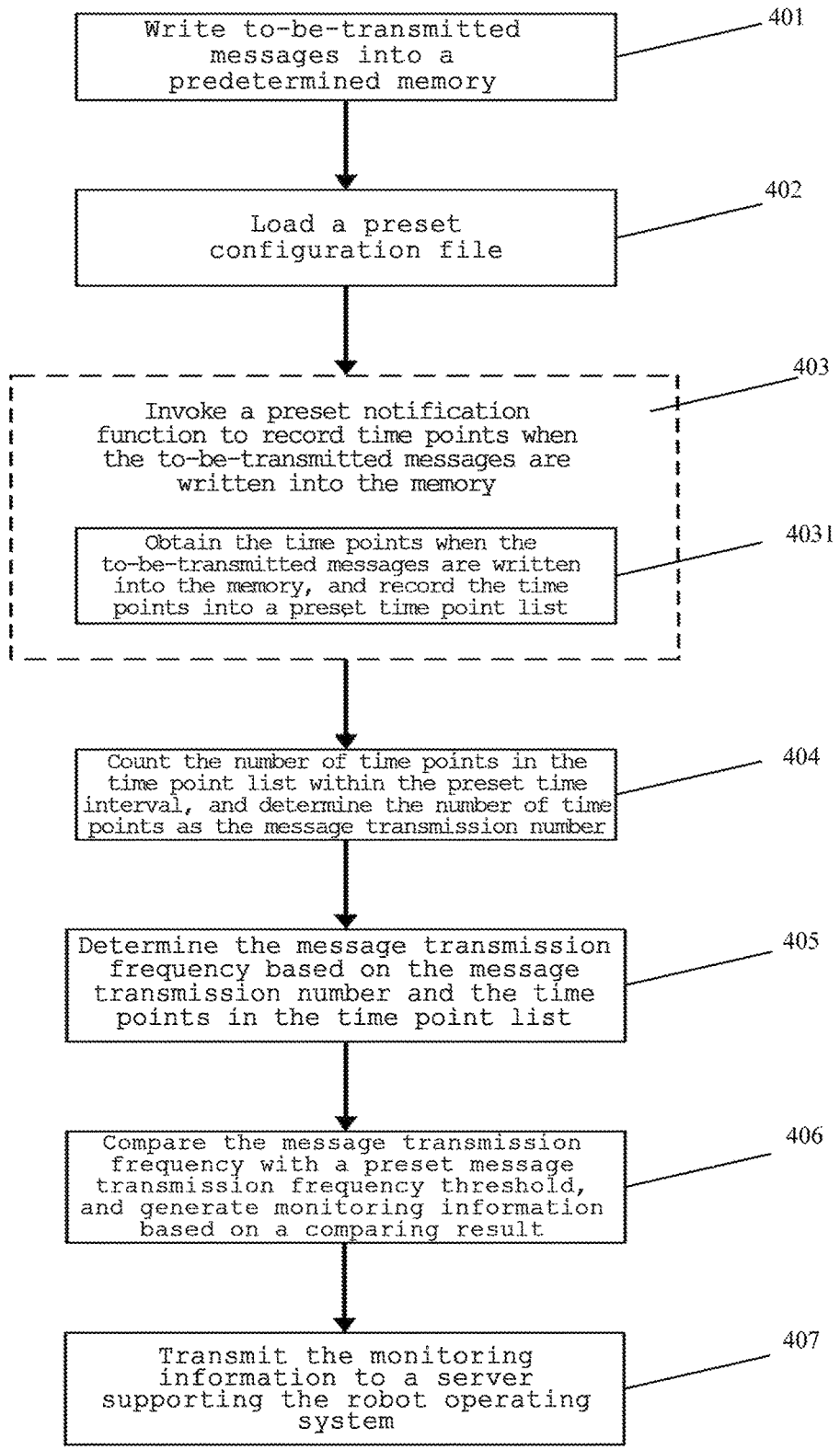
FIG. 4 is a flow chart of a method for monitoring a message transmission frequency in a robot operating system according to another embodiment of the present application.

Further reference will be made to FIG. 4 illustrating a flow 400 of a method for monitoring a message transmission frequency in a robot operating system according to of another embodiment the present application. The flow 400 of the method for monitoring the message transmission frequency in the robot operating system includes the following steps:

Step 401, write to-be-transmitted messages into a pre-allocated memory.

In this embodiment, the memory configured to store the to-be-transmitted messages is pre-allocated in an operating system on which the method for monitoring the message transmission frequency in the robot operating system operates (e.g., the robot operating system in the vehicle-mounted controller illustrated in FIG. 1), where the to-be-transmitted messages may be received messages, or messages to be sent. In this embodiment, the to-be-transmitted messages may be stored into the memory pre-allocated in the robot operating system.

Step 402, load a preset configuration file.

In this embodiment, processes in the operating system on which the method for monitoring the message transmission frequency in the robot operating system operates (e.g., the robot operating system in the vehicle-mounted controller illustrated in FIG. 1) may communicate a message with each other by subscribing to a topic, that is, a topic is a protocol. There are a number of processes running in the robot operating system, each application corresponds to at least one process, and each process may be regarded as a process node; and the nodes may transmit a message with each other by putting the message into one or more topics, and the nodes may issue a message in a topic, and alike receive a message by subscribing to a topic. The node may issue a message regardless whether there is another node to receive the message.

After the to-be-transmitted messages are written into the memory in step 401, the robot operating system operating on the vehicle-mounted controller loads automatically the configuration file in which process identification information of each of the processes is stored. The process identification information may be a process identifier, for example. Transmission protocol information is further stored in the configuration file. Since a protocol in the robot operating system is a topic, it should be appreciated that the transmission protocol information here is a topic name; and preset message transmission frequency thresholds are further stored in the configuration file.

Step 403, invoke a preset notification function to record time points when the to-be-transmitted messages are written into the memory.

In this embodiment, the robot operating system in the vehicle-mounted controller may have the preset notification function, and after the messages are written into the memory in step 401, the notification function is invoked by a main function of the message transmitting process to record the time points when the to-be-transmitted messages are written into the memory.

In this embodiment, after the notification function is invoked in step 403, the operation of step 4031 is performed in the notification function:

The step 4031 is to obtain the time points when the to-be-transmitted messages are written into the memory, and to record the time points into a preset time point list.

In this embodiment, the time point list is further preset in the robot operating system, and the notification function obtains the time points when the to-be-transmitted messages are written into the memory, and then records the obtained time points into the time point list.

In some optional implementations of this embodiment, after the time point list is full, if the latest time point is obtained, then the earliest time point recorded in the time point list will be removed according to the order of the time points when the to-be-transmitted messages are written into the memory recorded in the time point list, and thereafter the obtained time point will be added to the preset time point list.

Step 404, count the number of time points in the time point list within the preset time interval, and determine the number of time points as the message transmission number.

In this embodiment, a message transmitting thread may count the number of time points in the time point list within the preset time interval based on the time points recorded in the time point list in step 403, and also determine the number of time points as the message transmission number of the message transmitting process in the robot operating system within the predetermined period of time.

Step 405, determine the message transmission frequency based on the message transmission number and the time points in the time point list.

In this embodiment, the message transmission frequency may be determined based on the message transmission number obtained in step 404, and the time points recorded in the time point list.

For example, the message transmission number within one second may be counted and determined as the message transmission frequency of the message transmitting process. There are a number of threads configured in each process in the robot operating system, and if the processes transmit a message with each other, then a separate thread will be further created in the message transmitting processes to calculate the message transmission frequency.

In some optional implementations of this embodiment, the earliest time point in the preset time interval is retrieved from the time point list as a first message transmission time point.

The latest time point in the preset time interval is retrieved from the time point list as a last message transmission time point.

The message transmission frequency of the current process is calculated in the equation of:

$$f = \frac{n-1}{T_n - T_1},$$

where $T_1$ represents the first message transmission time point, $T_n$ represents the last message transmission time point, n represents the message transmission number, where n is a positive integer greater than or equal to 2, and f represents the message transmission frequency of the process.

Step 406, compare the message transmission frequency with a preset message transmission frequency threshold, and generate monitoring information based on a comparing result.

In this embodiment, there are a number of message transmission frequency thresholds preset in the robot operating system operating on the vehicle-mounted controller as illustrated in FIG. 1, the message transmission frequency obtained in step 405 is compared with the preset message transmission frequency thresholds, and the monitoring information related to the comparing result is generated based on the result, The message transmission frequency thresholds are recorded in the configuration file, and retrieved directly when the configuration file is loaded in step 402.

In some optional implementations of this embodiment, the monitoring information further includes a monitoring level. If the message transmission frequency is above a first preset message transmission frequency threshold and below a second preset message transmission frequency threshold, the monitoring information at a first monitoring level will be generated. If the message transmission frequency is above the second preset message transmission frequency threshold and below a third preset message transmission frequency threshold, the monitoring information at a second monitoring level will be generated. If the message transmission frequency is below the first preset message transmission frequency threshold or above the third preset message transmission frequency threshold, the monitoring information at a third monitoring level will be generated. The monitoring information at the first monitoring level may indicate that the message transmission frequency of the process is normal; the monitoring information at the third monitoring level may indicate that the message transmission frequency of the process is abnormal, and it may be determined that an application corresponding to the process is abnormal, based on the detected abnormal condition of the message transmission frequency of the process, and at this time the application will not be adopted; the monitoring information at the second monitoring level may indicate that the message transmission frequency of the process is critical, and at this time it may be determined whether the process is normal, based on the degree of importance of the application corresponding to the process.

By way of example, there are a number of sensors arranged on a driverless vehicle, e.g., a sensor configured to control the vehicle to turn and controlled by a vehicle-mounted controller. The operating system operating on the vehicle-mounted controller is a robot operating system. A number of processes controlling the operating of the sensor may communicate with each other. Taking one of the processes as an example, if a frequency threshold is preset in a configuration file, then if the message transmission frequency of the process is below 0.8 times the frequency threshold or above 1.1 times the frequency threshold, it will be determined that the message transmission frequency of the process at this time is abnormal, so that it may be determined that the sensor is operating abnormally; if the message transmission frequency is between 0.9 times the frequency threshold and 1.1 times the frequency threshold, it will be determined that the message transmission frequency of the process at this time is normal, and it will be determined whether the sensor is operating normally by further determining whether all the processes related to the operating sensor are normal; and if the message transmission frequency is between 0.8 times the frequency threshold and 0.9 times the frequency threshold, since the sensor configured to control turning is an important sensor of the driverless vehicle, it may be determined whether the sensor is operating normally by determining whether the other processes are operating normally, for example, if message transmission frequencies of the other processes are normal, it will be determined that the sensor is operating normally.

Step 407, transmit the monitoring information to a server supporting the robot operating system.

In this embodiment, the robot operating system may send information about the message transmission frequency to the server supporting the robot operating system based on the monitoring information generated in step 406. For example, a monitoring thread can be created in the message transmitting process, and the monitoring thread is configured to send the monitoring information to the server, so that the server obtains the real-time message transmission state of the process.

As can be seen from FIG. 4, unlike the embodiment corresponding to FIG. 2, in this embodiment, firstly the configuration file is added into which firstly information, such as message transmission frequency thresholds, and transmission protocols, are stored; secondly the notification function is added so that the time points when the messages are written into the memory may be recorded using the notification function; and lastly the monitoring information is additionally transmitted to the server supporting the robot operating system, so that the process itself may monitor the message transmission frequency thereof, thereby increasing the flexibility in monitoring the message transmission frequency.

Further reference will be made to FIG. 5, as an implementation of the methods illustrated in the above-mentioned drawings, the present application provides an embodiment for an apparatus for monitoring a message transmission frequency in a robot operating system. The embodiment of the apparatus corresponds to the embodiment of the method as illustrated in FIG. 2, and the apparatus may be specifically applied to various electronic devices.

Figure 5:
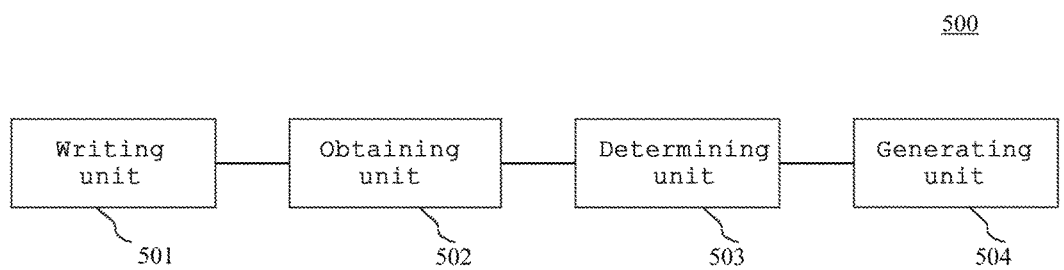
FIG. 5 is a schematic structural diagram of a apparatus for monitoring a message transmission frequency in a robot operating system according to of an embodiment the present application.

As illustrated in FIG. 5, the apparatus 500 for monitoring the message transmission frequency in the robot operating system according to this embodiment includes a writing unit 501, an obtaining unit 502, a determining unit 503, and a generating unit 504. The writing unit 501 is configured to write to-be-transmitted messages into a pre-allocated memory; the obtaining unit 502 is configured to obtain time points when the to-be-transmitted messages are written into the memory, and to record the time points in a preset time point list; the determining unit 503 is configured to determine a message transmission frequency within a preset time interval based on the time points in the time point list; and the generating unit 504 is configured to compare the message transmission frequency with a preset message transmission frequency threshold, and to generate monitoring information based on a comparing result.

In this embodiment, the concrete processes of the writing unit 501, the obtaining unit 502, the determining unit 503, and the generating unit 504 can refer to the detailed descriptions of the step 201, the step 202, the step 203, and the step 204 in the embodiment corresponding to FIG. 2, and will not be repeated herein.

In some optional implementations of this embodiment, the apparatus 500 further includes a loading unit (not illustrated) configured to load a preset configuration file. The configuration file is retrieved when processes are started, and the configuration file includes identification information of the processes, the message transmission frequency thresholds, and transmission protocol information of the robot operating system.

In some optional implementations of this embodiment, the obtaining unit 502 of the apparatus 500 includes an invoking sub-unit (not illustrated) configured to invoke a preset notification function to record the time points when the to-be-transmitted messages are written into the memory.

In some optional implementations of this embodiment, the obtaining unit 502 of the apparatus 500 is further configured to, if the time point list is full, remove the earliest time point in the time point list according to the order of the time points when the to-be-transmitted messages are written into the memory recorded in the time point list, and thereafter add the obtained time point to the preset time point list.

In some optional implementations of this embodiment, the determining unit 503 of the apparatus 500 includes: a counting sub-unit (not illustrated) configured to count the number of time points in the time point list within the preset time interval, and to determine the number of time points as the message transmission number; and a determining sub-unit (not illustrated) configured to determine the message transmission frequency based on the message transmission number, and the time points in the time point list.

In some optional implementations of this embodiment, the determining sub-unit of the apparatus 500 is further configured: to retrieve the earliest time point within the preset time interval from the time point list as a first message transmission time point; to retrieve the latest time point within the preset time interval from the time point list as a last message transmission time point; and to calculate the message transmission frequency in the equation of:

$$f = \frac{n-1}{T_n - T_1},$$

where $T_1$ represents the first message transmission time point, $T_n$ represents the last message transmission time point, n represents the message transmission number, where n is a positive integer greater than or equal to 2, and f represents the message transmission frequency.

In some optional implementations of this embodiment, the monitoring information includes a monitoring level; and the generating unit 504 is further configured to: generate the monitoring information at a first monitoring level, if the message transmission frequency is above a first preset message transmission frequency threshold and below a second preset message transmission frequency threshold; generate the monitoring information at a second monitoring level, if the message transmission frequency is above the second preset message transmission frequency threshold and below a third preset message transmission frequency threshold; and generate the monitoring information at a third monitoring level, if the message transmission frequency is below the first preset message transmission frequency threshold or above the third preset message transmission frequency threshold; and determine a message transmission state based on the monitoring information.

In some optional implementations of this embodiment, the apparatus 500 is further configured to send the monitoring information to a server supporting the robot operating system.

Figure 6:
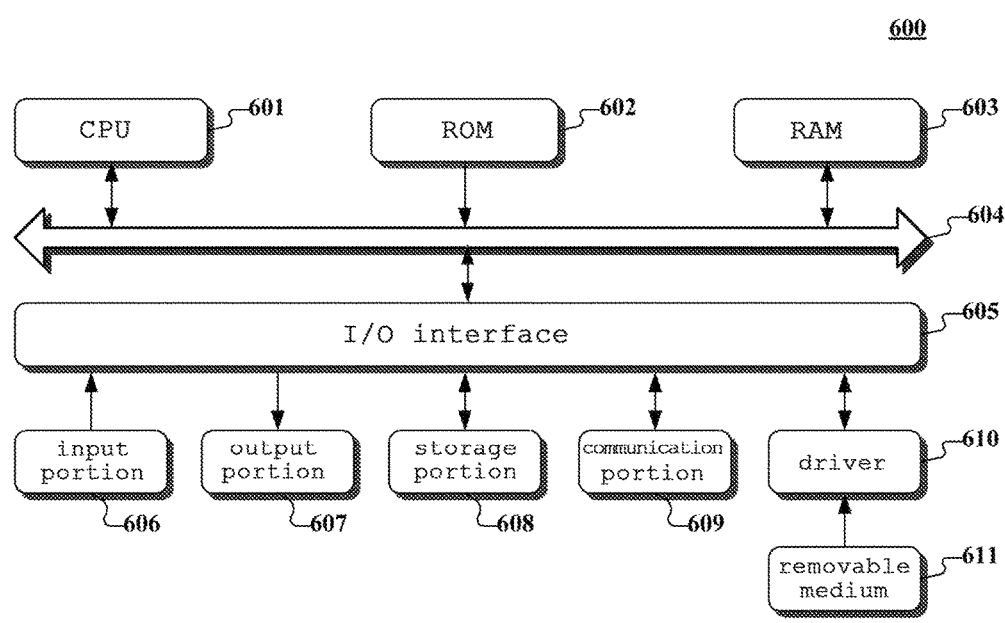
FIG. 6 is a schematic structural diagram of a computer system adapted to implement a terminal device or a server of the embodiments of the present application.

Referring to FIG. 6, a schematic structural diagram of a computer system 600 adapted to implement a terminal apparatus of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a liquid crystal display device (LCD), a speaker, etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow charts may be implemented in a computer software program. For example, an embodiment of the present disclosure includes a computer program product, which comprises a computer program that is tangibly embedded in a machine-readable medium. The computer program comprises program codes for executing the method of the flow charts. In such an embodiment, the computer program may be downloaded and installed from a network via the communication portion 609, and/or may be installed from the removable media 611. The computer program, when executed by the CPU 601, executes the above-mentioned functions in the methods of the present application.

The flow charts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present application may be implemented by way of software or hardware. The described units may also be provided in a processor, for example, described as: a processor, comprising a writing unit, an obtaining unit, a determining unit and a generating unit, where the names of these units are not considered as a limitation to the units or modules. For example, the writing unit may also be described as "a unit for writing to-be-transmitted messages into a pre-allocated memory".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The one or more programs, when executed by a device, cause the device to perform a method for monitoring a message transmission frequency in a robot operating system, the method comprising: writing to-be-transmitted messages into a pre-allocated memory; obtaining time points when the to-be-transmitted messages are written into the memory, and recording the time points in a preset time point list; determining a message transmission frequency within a preset time interval based on the time points in the time point list; comparing the message transmission frequency with a preset message transmission frequency threshold; and generating monitoring information based on a comparing result.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for monitoring a message transmission frequency in a robot operating system to reduce program debugging cost or improve monitoring efficiency, comprising:

writing to-be-transmitted messages into a pre-allocated memory;

obtaining time points when the to-be-transmitted messages are written into the memory, and recording the time points in a preset time point list;

determining a message transmission frequency within a preset time interval based on the time points in the time point list;

comparing the message transmission frequency with a preset message transmission frequency threshold; and generating monitoring information based on a comparing result, wherein the determining the message transmission frequency within the preset time interval based on the time points in the time point list comprises:

counting a number of the time points in the time point list within the preset time interval, and determining the number of the time points as a message transmission number; and determining the message transmission frequency based on the message transmission number and the time points in the time point list, the determining the message transmission frequency based on the message transmission number and the time points in the time point list comprises:

retrieving an earliest time point within the preset time interval from the time point list as a first message transmission time point;

retrieving a latest time point within the preset time interval from the time point list as a last message transmission time point; and calculating the message transmission frequency in an equation of:

$$f = \frac{n-1}{T_n - T_1},$$

where $T_1$ represents the first message transmission time point, $T_n$ represents the last message transmission time point, n represents the message transmission number, wherein n is a positive integer greater than or equal to 2, and f represents the message transmission frequency.

2. The method according to claim 1, further comprising: loading a preset configuration file, wherein the configuration file is retrieved when a process is started, and the configuration file comprises identification information of the process, the message transmission frequency threshold, and transmission protocol information of the robot operating system.

3. The method according to claim 1, wherein the obtaining the time points when the to-be-transmitted messages are written into the memory, and recording the time points in the preset time point list comprises:

invoking a preset notification function to record the time points when the to-be-transmitted messages are written into the memory.

4. The method according to claim 3, wherein the obtaining the time points when the to-be-transmitted messages are written into the memory, and recording the time points in the preset time point list comprises:

if the time point list is full, removing an earliest time point in the time point list according to an order of the time points when the to-be-transmitted messages are written into the memory recorded in the time point list, and adding the obtained time point to the time point list.

5. The method according to claim 1, wherein the monitoring information comprises a monitoring level, and the comparing the message transmission frequency with the preset message transmission frequency threshold, and generating the monitoring information based on the comparing result comprises:
  generating the monitoring information at a first monitoring level, if the message transmission frequency is above a first preset message transmission frequency threshold and below a second preset message transmission frequency threshold;
  generating the monitoring information at a second monitoring level, if the message transmission frequency is above the second preset message transmission frequency threshold and below a third preset message transmission frequency threshold; and
  generating the monitoring information at a third monitoring level, if the message transmission frequency is below the first preset message transmission frequency threshold or above the third preset message transmission frequency threshold; and
  determining a message transmission state based on the monitoring information.

6. The method according to claim 1, further comprising:
  sending the monitoring information to a server supporting the robot operating system.

7. An apparatus for monitoring a message transmission frequency in a robot operating system to reduce program debugging cost or improve monitoring efficiency, the apparatus comprising:
  at least one processor; and
  a memory storing instructions, the instructions when executed by the at least one processor, cause the at least one processor to perform operations, the operations comprising:
    writing to-be-transmitted messages into a pre-allocated memory;
    obtaining time points when the to-be-transmitted messages are written into the memory, and recording the time points in a preset time point list;
    determining a message transmission frequency within a preset time interval based on the time points in the time point list; and
    comparing the message transmission frequency with a preset message transmission frequency threshold, and generating monitoring information based on a comparing result,
  wherein the determining the message transmission frequency within the preset time interval based on the time points in the time point list comprises:
    counting a number of the time points in the time point list within the preset time interval, and determining the number of the time points as a message transmission number; and
    determining the message transmission frequency based on the message transmission number and the time points in the time point list,
  the determining the message transmission frequency based on the message transmission number and the time points in the time point list comprises:
    retrieving an earliest time point within the preset time interval from the time point list as a first message transmission time point;
    retrieving a latest time point within the preset time interval from the time point list as a last message transmission time point; and
    calculating the message transmission frequency in an equation of:

$$f = \frac{n-1}{T_n - T_1},$$

where $T_1$ represents the first message transmission time point, $T_n$ represents the last message transmission time point, n represents the message transmission number, wherein n is a positive integer greater than or equal to 2, and f represents the message transmission frequency.

8. The apparatus according to claim 7, wherein the operations further comprise:
  loading a preset configuration file, wherein the configuration file is retrieved when a process is started, and the configuration file comprises identification information of the process, the message transmission frequency threshold, and transmission protocol information of the robot operating system.

9. The apparatus according to claim 7, wherein the obtaining the time points when the to-be-transmitted messages are written into the memory, and recording the time points in the preset time point list comprises:
  invoking a preset notification function to record the time points when the to-be-transmitted messages are written into the memory.

10. The apparatus according to claim 9, wherein the obtaining the time points when the to-be-transmitted messages are written into the memory, and recording the time points in the preset time point list comprises:
  if the time point list is full, removing an earliest time point in the time point list according to an order of the time points when the to-be-transmitted messages are written into the memory recorded in the time point list, and adding the obtained time point to the time point list.

11. The apparatus according to claim 7, wherein the monitoring information comprises a monitoring level, and
  the comparing the message transmission frequency with the preset message transmission frequency threshold, and generating the monitoring information based on the comparing result comprises:
  generating the monitoring information at a first monitoring level, if the message transmission frequency is above a first preset message transmission frequency threshold and below a second preset message transmission frequency threshold;
  generating the monitoring information at a second monitoring level, if the message transmission frequency is above the second preset message transmission frequency threshold and below a third preset message transmission frequency threshold; and
  generating the monitoring information at a third monitoring level, if the message transmission frequency is below the first preset message transmission frequency threshold or above the third preset message transmission frequency threshold; and
  determining a message transmission state based on the monitoring information.

12. The apparatus according to claim 7, wherein operations further comprise:
  sending the monitoring information to a server supporting the robot operating system.

13. A non-transitory computer-readable storage medium storing a computer program, the computer program when executed by one or more processors, causes the one or more processors to perform operations, the operations comprising:

writing to-be-transmitted messages into a pre-allocated memory;

obtaining time points when the to-be-transmitted messages are written into the memory, and recording the time points in a preset time point list;

determining a message transmission frequency within a preset time interval based on the time points in the time point list;

comparing the message transmission frequency with a preset message transmission frequency threshold; and generating monitoring information based on a comparing result, wherein the determining the message transmission frequency within the preset time interval based on the time points in the time point list comprises:

counting a number of the time points in the time point list within the preset time interval, and determining the number of the time points as a message transmission number; and determining the message transmission frequency based on the message transmission number and the time points in the time point list, the determining the message transmission frequency based on the message transmission number and the time points in the time point list comprises:

retrieving an earliest time point within the preset time interval from the time point list as a first message transmission time point;

retrieving a latest time point within the preset time interval from the time point list as a last message transmission time point; and calculating the message transmission frequency in an equation of:

$$f = \frac{n-1}{T_n - T_1},$$

where $T_1$ represents the first message transmission time point, $T_n$ represents the last message transmission time point, n represents the message transmission number, wherein n is a positive integer greater than or equal to 2, and f represents the message transmission frequency.

* * * * *